(12) United States Patent
Chaput et al.

(10) Patent No.: US 6,214,401 B1
(45) Date of Patent: Apr. 10, 2001

(54) COOKING VESSEL FOR INDUCTION HEATING AND ALLOY AND METHOD FOR PRODUCING SUCH A VESSEL

(75) Inventors: Laurent Chaput; Lucien Coutu, both of Sauvigny lès Bois; Marc Leroy, Antony; Yves Grosbety, Noisy le Grand, all of (FR)

(73) Assignee: Imphy Ugine Precision, Puteaux (FR)

( * ) Notice: Subject to any disclaimer, the term of this patent is extended or adjusted under 35 U.S.C. 154(b) by 0 days.

(21) Appl. No.: 09/451,916

(22) Filed: Dec. 1, 1999

(30) Foreign Application Priority Data

Dec. 1, 1998 (FR) .................................................. 98 15105

(51) Int. Cl.⁷ ...................................................... A47J 36/00
(52) U.S. Cl. ...................... 426/523; 126/390; 219/621; 220/912
(58) Field of Search ............................ 426/523; 99/451, 99/DIG. 14; 126/390; 219/621; 220/912

(56) References Cited

U.S. PATENT DOCUMENTS

| | | | |
|---|---|---|---|
| 4,441,940 | * 4/1984 | Pfeifer et al. | 148/312 |
| 5,064,055 | * 11/1991 | Bessenbach et al. | 126/390 |
| 5,669,989 | * 9/1997 | Inoue et al. | 148/312 |

FOREIGN PATENT DOCUMENTS

| | | |
|---|---|---|
| 1198477 | * 11/1998 | (CN) . |
| 2 453 627 | 11/1980 | (FR) . |
| 2 527 916 | 12/1983 | (FR) . |
| 2 689 748 | 10/1993 | (FR) . |

OTHER PUBLICATIONS

Patent Abstracts of Japan; vol. 15, No. 114, Mar. 19, 1991 & JP 03 004479, Jan. 10, 1991.

Chemical Abstracts, vol. 115, No. 16, Oct. 21, 1991; Abstract No. 163973; "Thermal –spray coating of stainless steel pot bottom with copper alloy"; XP–002109861.

S.R. Lampman et al; "Metals Handbook"; vol. 2; 1990; ASM International, Metals Park, Ohio, US XP002109860; pp. 435–437.

\* cited by examiner

Primary Examiner—George C. Yeung
(74) Attorney, Agent, or Firm—Oblon, Spivak, McClelland, Maier & Neustadt, P.C.

(57) ABSTRACT

Cooking vessel intended to be induction heated, comprising a heating part made of a ferromagnetic alloy having a Curie temperature of between 150° C. and 370° C. and a magnetostriction coefficient $\lambda_s \leq 5 \times 10_{-6}$ in absolute value. FeNiCuX ferromagnetic alloy for the manufacture of the cooking vessel, the chemical composition of which comprises from 50% to 85% of Ni, less than 50% of Cu, less than 12% of X=Cr+Mo+Mn+Si+Al+W+Nb+V+Ti, the balance being iron and impurities; the composition satisfies the relationships $(35/25) \times (75-Ni) \leq Cu \leq (50/35) \times (85-Ni)$ and $(7/20) \times (Ni-65) \leq X \leq (12/35) \times (Ni-50)$. Production method and method of use.

14 Claims, No Drawings

COOKING VESSEL FOR INDUCTION HEATING AND ALLOY AND METHOD FOR PRODUCING SUCH A VESSEL

BACKGROUND OF THE INVENTION

1. Field of the Invention

The present invention relates to a cooking vessel which may be, and which may be specially intended and designed to be, induction heated. Also included are an alloy for producing such a vessel, and a method for making the vessel.

2. Discussion of the Background

Cooking vessels, such as saucepans, brazing pans or frying pans, are generally made of a food-compatible alloy, such as an austenitic stainless steel or an aluminum alloy. When they are intended to be induction heated, these cooking vessels include, in the external part of their bottom, an insert made of a ferromagnetic alloy. This is because food-compatible alloys are generally nonmagnetic and, consequently, cannot be induction heated given the frequency range (20 to 50 kilohertz) generally permitted. On the other hand, the insert made of a ferromagnetic alloy can be induction heated and constitutes a heating part. Various constructions exist. For example, when the vessel is made of an aluminum alloy, the heating part may be a grid inserted into the bottom of the vessel. When the vessel is made of an austenitic stainless steel, the heating part is a plate made of a ferromagnetic alloy placed on the external wall of the bottom and either separated from the wall by an aluminum layer intended to distribute the heat well or joined to the bottom and covered on its external face with an austenitic stainless steel layer intended to ensure good corrosion resistance.

In general, the ferromagnetic material used for the heating part is a ferritic stainless steel. This technique has the drawback of allowing induction heating up to temperatures that may be as high as 600° C. when the vessel is left on the induction-heating device. As a result, the food may be burnt and the vessels damaged.

In order to remedy this drawback, it has been proposed, particularly in French patent applications No. 2,527,916, No. 2,453,627 and No. 2,689,748, to use heating parts made of a ferromagnetic alloy having a Curie temperature that is not too high, for example between 60° C. and 350° C., so as to avoid overheating. The advantage of a heating part made of a ferromagnetic alloy whose Curie temperature is not too high is that, when the temperature of the heating element becomes close to the Curie temperature of the alloy, the heating part becomes gradually nonmagnetic, which stops the heating. This results in a thermostatic effect whose consequence is that the temperature of the bottom of the cooking vessel cannot exceed the Curie temperature of the alloy of which the heating part is composed. It should be noted however that the aforementioned patent applications either give only very vague information about the alloys that can be used or propose the use of alloys which are not suitable for the envisaged use. For example, French patent application 2,689,748 proposes the use of Fe—36Ni or of Fe—18Ni9Co5Mo or of Fe—80Ni5Mo. None of these solutions are satisfactory.

The alloy Fe—36Ni is well known. This is an alloy having a very low thermal expansion coefficient incompatible with the thermal expansion coefficient of an austenitic stainless steel or of an aluminum alloy. The use of this alloy would result in a very large bimetallic effect leading either to the bottom of the cooking vessel distorting or the heating element disbanding. In addition, this alloy is not corrosion resistant.

The alloy Fe—18Ni9Co5Mo is a well-known maraging steel but does not absolutely have the required properties. Its choice probably results from a confusion between the Curie temperature and the martensitic transformation start temperature Ms.

The alloy Fe—80Ni5Mo, also well known, but it is not suitable either, since its Curie temperature is approximately 450° C.

Moreover, cooking vessels intended for induction heating furthermore have the drawback of producing a disagreeable whistling noise when they are heated.

SUMMARY OF THE INVENTION

One object of the present invention is to provide a process for producing a cooking vessel intended to be induction heated which can be left on an induction-heating appliance without the risk of overheating, Another object is to provide a cooking vessel where induction heating of the vessel does not generate noise. Alloys for such vessels are also provided, as is a method of making such vessels.

In more detail, one subject of the invention is a cooking vessel intended to be induction heated, comprising a heating part made of a ferromagnetic alloy having a Curie temperature of between 150° C. and 370° C., including 175, 200, 225, 250, 275, 300, 325, and 350° C., and preferably less than 350° C., and a magnetostriction coefficient $\lambda_s \leq 5 \times 10^{-6}$ in absolute value. Preferably, the alloy has a Curie temperature of between 275° C. and 340° C., and better still between 275° C. and 325° C., and a magnetostriction coefficient $\lambda_s \leq 3 \times 10^{-6}$ in absolute value.

The ferromagnetic alloy of which the heating part comprises, consists essentially of, or consists of, is, for example, an alloy of the FeNiCuX type, X being one or more elements taken from Cr, Mo, Mn, Si, Al, W, Nb, V and Ti, the chemical composition of the alloy (in % by weight) being such that:

$50\% \leq Ni \leq 85\%$ $0\% \leq Cu \leq 50\%$ $0\% \leq X \leq 12\%$ $(35/25) \times (75 - Ni) \leq Cu \leq (50/35) \times (85 - Ni)$ $(7/20) \times (Ni - 65) \leq X \leq (12/35) \times (Ni - 50)$ with: X=Cr+Mo+Mn+Si+Al+W+Nb+V+Ti, the balance comprising, consisting essentially of, or consisting of iron and impurities resulting from smelting.

Preferably, the chemical composition of this alloy is such that:

$55\% \leq Ni \leq 65\%$ $22\% \leq Cu \leq 36\%$ $0\% \leq X \leq 3\%$.

Better still, the copper content is between 25% and 35%.

The heating part is not limited in terms of shape or size and may be composed of an insert incorporated into the bottom of the vessel, which insert may in particular be a plate.

The heating part may also constitute the wall of the vessel and be covered, at least on its internal part, with a layer of enamel.

The invention will now be further described in a nonlimiting manner and illustrated by examples.

The inventors have found that, with a cooking vessel such as a saucepan, the wall of which is made of a ferromagnetic alloy whose Curie temperature is close to 150° C., it is possible to heat water by induction up to approximately 100° C. When the Curie temperature is of the order of 300° C. to 350° C., it is possible for oil to be efficiently heated up to approximately 200° C. without the temperature rising to excessive values. The Curie temperature may be above 350° C., but it is highly preferable for it to remain less than 370° C.

The inventors have also found that, when the ferromagnetic alloy has a low magnetostriction coefficient $\lambda_s$, that is to say a coefficient whose absolute value is less than $5\times10^{-6}$ and preferably less than $3\times10^{-6}$, the induction heating does not produce the disagreeable noise usually associated with induction heating.

Finally, the inventors have found that an alloy comprising, consisting essentially of, or which consists of the following composition (in % by weight):

$$50\% \leq Ni \leq 85\%$$

$$0\% \leq Cu \leq 50\%$$

$$0\% \leq X \leq 12\%$$

$$(35/25)\times(75-Ni) \leq Cu \leq (50/35)\times(85-Ni)$$

$$(7/20)\times(Ni-65) \leq X \leq (12/35)\times(Ni-50)$$

with: X=Cr+Mo+Mn+Si+Al+W+Nb+V+Ti, iron and impurities resulting from smelting, is ferromagnetic, has a Curie temperature of between 150° C. and 370° C., has a low magnetostriction coefficient $\lambda_s$ (the absolute value of which may be less than $5\times10^{-6}$) and has a thermal expansion coefficient compatible, for example, with that of a stainless steel. By adjusting the chemical composition within the ranges defined above, it is possible at the same time to adjust the Curie temperature so that it is between 250° C. and 300° C. or close to 300° C., thereby making it possible to obtain a vessel suitable both for heating water and for heating oil, and the magnetostriction coefficient so that its absolute value is less than $3\times10^{-6}$, thereby being favorable to noise reduction. Preferably, the nickel content is between 55% and 65%, the copper content is between 22% and 36%, and better still between 25% and 36%, and the content of X is between 0% and 3%.

The iron, nickel and copper, within the compositional ranges defined above, make it possible to obtain a ferromagnetic alloy having a very low magnetostriction coefficient.

The complementary elements (Cr, Mo, Mn, Si, Al, W, Nb, V, Ti) allow the Curie temperature to be adjusted without increasing the absolute value of the magnetostriction coefficient. Moreover, these elements allow other properties of the alloy to be adjusted, such as, in particular, the corrosion resistance, the mechanical strength and the capability of being formed by hot or cold plastic deformation. In particular, the manganese and silicon contents, although possibly being zero, are generally greater than 0.1% because of the smelting conditions.

It should be noted that the compositional limits for copper, nickel and the other elements also lead to the fact that the composition should satisfy the relationships:

$$25\times Cu + 100\times X \geq 350$$

and $$12\times Cu + 50\times X \leq 600.$$

More specifically, in order to obtain an almost zero magnetostriction coefficient and a Curie temperature close to 300° C., it is preferable for the composition of the alloy to approximately satisfy the following equations:

$$Ni = 80 - (35/50)\times Cu$$

and $$100\times X = (Ni\% - 50)^2.$$

In one embodiment, a saucepan is obtained by deep drawing a blank made of a ferromagnetic alloy having a Curie temperature of between 150° C. and 370° C. and a magnetostriction coefficient $\lambda_s \leq 5\times10^{-6}$ in absolute value, and preferably, the Curie temperature is between 275° C. and 340° C., and for example less than 325° C., and the magnetostriction coefficient $\lambda_s$ is less than or equal to $3\times10^{-6}$ in absolute value. The ferromagnetic alloy is, for example, an alloy as defined above. In order to ensure compatibility with food that is cooked in the casserole, at least the inner wall of the latter is enameled. The bottom of the saucepan then serves as the heating element.

By way of a first example, an experimental flat-bottomed cooking vessel having a side wall slightly flared upward is produced by deep drawing a blank having a thickness of 1 mm, made of a ferromagnetic alloy whose chemical composition comprises approximately 70.3% Ni, 14.2% Cu, 3.2% Cr, 0.55% Mn and 0.21% Si, the balance being iron and impurities resulting from smelting. The bottom of the vessel has a diameter of 230 mm and the side wall has a height of 100 mm. The Curie temperature of the alloy is close to 300° C. and its magnetostriction coefficient is, in absolute value, between $1\times10^{-6}$ and $2\times10^{-6}$. Since this vessel is for purely experimental purposes, it is not enameled.

When the empty vessel is induction heated on a hotplate of a commercial cooker, the temperature of the bottom reaches a maximum temperature of 240° C., which shows that the vessel would not be seriously damaged if it were to be accidentally forgotten about on a heating device.

When the vessel is partially filled with food-grade sunflower oil and induction heated as in the previous case, the temperature of the oil rises up to approximately 190° C. and the temperature rise is accomplished slightly more quickly than with heating using a large gas burner of a commercial gas cooker.

In both cases, the induction heating produces no noise.

As a second example, an experimental cooking vessel identical to that of the previous example, but with the composition of the ferromagnetic alloy comprising 80.5% Ni, 0.5% Cu, 8.3% Mo, 0.45% Mn and 0.1% Si, the balance being iron and impurities resulting from smelting, is produced. This alloy has a Curie temperature and a magnetostriction coefficient which are very close to those of the alloy of the previous example. The tests carried out under the same conditions give identical results. In particular, the induction heating produces no noise.

In another embodiment, the saucepan is essentially made of austenitic stainless steel, for example of the 18% chromium/8% nickel type, and has a multilayer bottom composed of an aluminum layer intended to distribute the heat and a layer made of a ferromagnetic alloy having a thickness of between 0.6 and 1 mm, having a Curie temperature of between 150° C. and 370° C. and a magnetostriction coefficient $\lambda_s \leq 5\times10^{-6}$ in absolute value, and preferably a Curie temperature of between 275° C. and 340° C., and for example less than 325° C., and a magnetostriction coefficient $\lambda_s$ less than or equal to $3 \times 10^{-6}$ in absolute value. The ferromagnetic alloy constituting the heating element of the saucepan is, for example, an alloy as defined above.

In a variant, the alloy layer is held between two layers of austenitic stainless steel, or it may even be directly welded to the austenitic stainless steel of which the saucepan is essentially composed.

In a third embodiment, the cooking vessel is a frying pan essentially composed of an aluminum alloy whose surface intended to be in contact with food may be coated with a nonstick material. A grid made of a ferromagnetic alloy as described herein and constituting the heating element is inserted into the bottom of the frying pan.

Other embodiments may be imagined, provided that they use a heating element made of a ferromagnetic alloy having a Curie temperature of between 150° C. and 370° C., and preferably between 275° C. and 340° C., and a magnetostriction coefficient $\lambda_s \leq 5 \times 10^{-6}$ in absolute value, and preferably $\lambda_s \leq 3 \times 10^{-6}$.

As noted above, the method for producing the invention vessel comprises shaping the vessel and incorporating a heating part made by shaping the invention alloy described above. For vessels made completely of the invention alloy a one-step shaping may be all that is required. Optional enameling, etc. may also be done. A method of cooking with such a vessel is also included herein, comprising heating food or a food ingredient in the vessel of the invention.

As used herein, the term approximately means $\leq \pm 20\%$, more preferably $\leq \pm 15\%$, even more preferably $\leq \pm 10\%$, and highly preferably $\leq \pm 5\%$.

French patent application 98 15105 is incorporated herein by reference.

In the above composition the Cu—Ni relationship may also be:

$$(32/25) \times (75-Ni) \leq Cu \leq (50/35) \times (85-Ni)$$

What is claimed is:

1. A cooking vessel comprising a heating part, said heating part comprising a ferromagnetic alloy, wherein said ferromagnetic alloy has a Curie temperature of between 150° C. and 370° C. and a magnetostriction coefficient $\lambda_s \leq 5 \times 10^{-6}$ in absolute value.

2. The cooking vessel as claimed in claim 1, wherein the Curie temperature is less than 350° C.

3. The cooking vessel as claimed in claim 1, wherein the ferromagnetic alloy has a Curie temperature of between 275° C. and 340° C. and a magnetostriction coefficient $\lambda_s \leq 3 \times 10^{-6}$ in absolute value.

4. The cooking vessel as claimed in claim 3, wherein the Curie temperature is less than 325° C.

5. The cooking vessel as claimed in claim 1, wherein the chemical composition of the alloy (in % by weight) comprises:

$50\% \leq Ni \leq 85\%$ $0\% \leq Cu \leq 50\%$ $0\% \leq X \leq 12\%$ $(35/25) \times (75-Ni) \leq Cu \leq (50/35) \times (85-Ni)$ $(7/20) \times (Ni-65) \leq X \leq (12/35) \times (Ni-50)$ where X is one or more elements selected from the group consisting of Cr, Mo, Mn, Si, Al, W, Nb, V and Ti the sum of which meet the requirement $(7/20) \times (Ni-65) \leq X \leq (12/35) \times (Ni-50)$, iron and impurities resulting from smelting.

6. The cooking vessel as claimed in claim 5, wherein the chemical composition of the alloy is such that:

$55\% \leq Ni \leq 65\%$ $22\% \leq Cu \leq 36\%$ $0\% \leq X \leq 3\%$.

7. The cooking vessel as claimed in claim 6, wherein the copper content is between 25% and 35%.

8. The cooking vessel as claimed in claim 1, wherein the heating part is an insert incorporated into the bottom of the vessel.

9. The cooking vessel as claimed in claim 8, wherein the insert is a plate.

10. The cooking vessel as claimed in claim 1, wherein the heating part constitutes the wall of a vessel.

11. A method of cooking, comprising heating food or a food ingredient in a cooking vessel comprising a heating part, said heating part comprising a ferromagnetic alloy, wherein said ferromagnetic alloy has a Curie temperature of between 150° C. and 370° C. and a magnetostriction coefficient $\lambda_s 5 \times 10^{-6}$ in absolute value.

12. A method of cooking, comprising heating food or a food ingredient in a cooking vessel comprising a heating part, said heating part comprising a ferromagnetic alloy, wherein said ferromagnetic alloy has a Curie temperature of between 150° C. and 370° C. and a magnetostriction coefficient $\lambda_s 5 \times 10^{-6}$ in absolute value, wherein the chemical composition of the alloy (in % by weight) comprises:

$50\% \leq Ni \leq 85\%$ $0\% \leq Cu \leq 50\%$ $0\% \leq X \leq 12\%$ $(35/25) \times (75-Ni) \leq Cu \leq (50/35) \times (85-Ni)$ $(7/20) \times (Ni-65) \leq X \leq (12/35) \times (Ni-50)$ where X is one or more elements selected from the group consisting of Cr, Mo, Mn, Si, Al, W, Nb, V and Ti the sum of which meet the requirement $(7/20) \times (Ni-65) \leq X \leq (12/35) \times (Ni-50)$, iron and impurties resulting from smelting.

13. A method of cooking, comprising heating food or a food ingredient in the cooking vessel of claim 12, wherein the chemical composition of the alloy is such that:

$55\% \leq Ni \leq 65\%$ $22\% \leq Cu \leq 36\%$ $0\% \leq X \leq 3\%$.

14. A method of cooking, comprising heating food or a food ingredient in the cooking vessel of claim 11, wherein the heating part is a plate which is incorporated into the bottom of the vessel.

* * * * *